(12) United States Patent
Park et al.

(10) Patent No.: US 10,571,732 B2
(45) Date of Patent: Feb. 25, 2020

(54) LIQUID CRYSTAL DISPLAY AND METHOD FOR MANUFACTURING THE SAME

(71) Applicant: LG DISPLAY CO., LTD., Seoul (KR)

(72) Inventors: Sejeon Park, Gyeonggi-do (KR); Sudong Roh, Seoul (KR); Wonjong Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/376,869

(22) Filed: Apr. 5, 2019

(65) Prior Publication Data

US 2019/0235306 A1 Aug. 1, 2019

Related U.S. Application Data

(62) Division of application No. 15/338,585, filed on Oct. 31, 2016, now Pat. No. 10,288,924.

(30) Foreign Application Priority Data

Oct. 30, 2015 (KR) .................. 10-2015-0152686

(51) Int. Cl.
*G02F 1/1335* (2006.01)
*F21V 8/00* (2006.01)

(52) U.S. Cl.
CPC ..... *G02F 1/133504* (2013.01); *G02B 6/0055* (2013.01); *G02F 1/133528* (2013.01); *G02F 1/133606* (2013.01); *G02F 1/133615* (2013.01); *G02B 6/0053* (2013.01); *G02B 6/0056* (2013.01); *G02B 6/0065* (2013.01); *G02F 2001/133607* (2013.01); *G02F 2201/50* (2013.01)

(58) Field of Classification Search
CPC ......... G02F 1/133504; G02F 1/133528; G02F 1/133606; G02F 1/133615; G02F 2001/133607; G02F 2201/50; G02B 6/0053; G02B 6/0055; G02B 6/0056; G02B 6/0065
See application file for complete search history.

(56) References Cited

U.S. PATENT DOCUMENTS

| 2004/0228106 | A1* | 11/2004 | Stevenson | G02B 5/045 362/627 |
| 2009/0303416 | A1* | 12/2009 | Jeong | G02B 5/045 349/64 |
| 2011/0187966 | A1 | 8/2011 | Yokota | |

\* cited by examiner

*Primary Examiner* — Nathanael R Briggs
(74) *Attorney, Agent, or Firm* — Morgan, Lewis & Bockius LLP

(57) ABSTRACT

A liquid crystal display includes a display panel; and an optical film on a bottom surface of the display panel, the optical film including a polarizer; a support sheet on a bottom surface of the polarizer; and a prism sheet on a bottom surface of the support sheet, the prism sheet having a base sheet, a prism portion, and a stitch portion over the base sheet. The prism portion includes a plurality of peaks and has a space defined by a direct contact between the plurality of peaks of the prism portion and the bottom surface of the support sheet.

11 Claims, 13 Drawing Sheets

Moisture permeates because space between mountains of prism function as pipe

FIG. 17

| | Comparative example 1 | Embodiment 1 | Embodiment 2 |
|---|---|---|---|
| | | Width of stitch unit 0.5mm | Width of stitch unit 1mm |
| Evaluation structure | LPOL / SSP / VVVV / PS | LPOL / SSP / VVVV / PS | LPOL / SSP / VVVV / PS (STP) |
| Results of water immersion evaluation | → Generation of capillary phenomenon (strong level), NG | → Some generation of capillary phenomenon (weak level), NG | → Capillary phenomenon not generated, OK |

LIQUID CRYSTAL DISPLAY AND METHOD FOR MANUFACTURING THE SAME

This application is a Divisional of U.S. patent application Ser. No. 15/338,585, filed Oct. 31, 2016, which claims the benefit of Korean Patent Application No. 10-2015-0152686, filed on Oct. 30, 2015, both which are hereby incorporated herein by reference for all purposes as if fully set forth herein.

BACKGROUND OF THE INVENTION

Field of the Invention

The present disclosure relates to a liquid crystal display having an optical film embedded therein, and more particularly, to a liquid crystal display having a structure in which an optical film for the uniformity and light focusing of backlight provided by a backlight unit has been laminated on a lower polarizer and a method for manufacturing the same.

Discussion of the Related Art

The use of liquid crystal displays has gradually broadened due to characteristics such as light weight, thin profile, and low power consumption. The liquid crystal display is used in portable computers, such as notebook PCs, office automation devices, audio/video devices, and indoor and outdoor advertising displays. A transmission-type liquid crystal display, which is the most common type of liquid crystal display, displays an image by modulating light incident from a backlight unit through control of an electric field applied to a liquid crystal layer.

The backlight unit may be categorized into a direct-type and an edge-type. The direct-type backlight unit has an arrangement in which a plurality of light sources is disposed under a liquid crystal display panel. The edge-type backlight unit has an arrangement in which a light source is disposed to face the side of a light guide plate and a plurality of optical films is disposed between a liquid crystal display panel and the light guide plate. In the edge-type backlight unit, the light source radiates light to one side of the light guide plate, and the light guide plate converts a line light source or a dot light source into a surface light source. The edge-type backlight unit has an advantage in that it can be implemented with a thinner profile than the direct-type backlight unit.

A liquid crystal display including an edge-type backlight unit according to a technology of the related art will be described with reference to FIGS. 1 and 2. FIG. 1 is an exploded perspective view showing the structure of the liquid crystal display including an edge-type backlight unit according to the related art. FIG. 2 is a cross-sectional view showing the structure of the liquid crystal display including an edge-type backlight unit according to the related art taken along line I-I' of FIG. 1.

As shown in to FIGS. 1 and 2, the liquid crystal display according to the related art includes a liquid crystal display panel LCP and an edge-type backlight unit EBLU disposed under the liquid crystal display panel LCP. The liquid crystal display panel LCP has a liquid crystal layer LC formed between an upper glass substrate SU and a lower glass substrate SL, and may be implemented in any liquid crystal mode.

The edge-type backlight unit EBLU includes a light source LS, a light guide plate LG, and an optical film OPT. The edge-type backlight unit EBLU converts light output by the light source LS into a uniform surface light source using the light guide plate LG and the optical films OPT. Then, the edge-type backlight unit EBLU provides the converted uniform surface light source to the liquid crystal display panel LCP. Furthermore, a reflection plate REF for returning light that leaks through the bottom of the light guide plate LG to the light guide plate LG may be further provided under the light guide plate LG.

A cover bottom CB is disposed under the reflection plate REF. The cover bottom CB may have a bowl shape in which the edge-type backlight unit EBLU is received. Furthermore, the cover bottom CB includes a material having high thermal conductivity and high stiffness so that heat from the light source LS can be smoothly discharged to the outside. For example, the cover bottom CB may be fabricated using a metal plate, such as aluminum (Al), aluminum nitride (AlN), an electronic galvanized steel sheet (EGI), stainless steel (SUS), Galvalume (SGLC), an aluminized steel sheet (so-called ALCOSTA), or a tin plate steel sheet (SPTE). Furthermore, the metal plate may be coated with a high conductivity material for accelerating thermal transfer.

A guide panel GP and the top case TC are disposed at the edge of the liquid crystal display panel LCP. The guide panel GP has a rectangular mold frame in which glass fiber is mixed in a synthetic resin, such as polycarbonate. The guide panel GP surrounds the top edge and sides of the liquid crystal display panel LCP and surrounds the sides of the edge-type backlight unit EBLU. The guide panel GP supports the liquid crystal display panel LCP and regularly maintains the interval between the liquid crystal display panel LCP and the optical film OPT. The top case TC is made of a metal material, such as a zinc plate steel sheet, and has a structure that surrounds the top and sides of the guide panel GP. The top case TC is fixed to at least one of the guide panel GP and the cover bottom CB by a hook or screw.

A light-emitting device having high brightness with low power, such as an LED, may be used as the light source LS. The light source LS supplies light to the light guide plate LG. In the edge-type backlight unit EBLU, the light source LS is located at the side of the liquid crystal display panel LCP. That is, the light source LS supplies light to a side of the light guide plate LG in accordance with at least one side of the light guide plate LG.

The light guide plate LG has a panel-type rectangular parallelepiped shape having a face corresponding to the area of the liquid crystal display panel LCP. The top surface of the light guide plate LG faces the liquid crystal display panel LCP. The light guide plate LG functions to receive light from the light source LS installed on the side of the light guide plate LG, to diffuse, and to distribute the light therein so that the light is uniformly distributed within the light guide plate LG. Additionally, the light guide plate LG guides the light to the top surface in which the liquid crystal display panel LCP has been disposed.

The light guided to the liquid crystal display panel LCP by the light guide plate LG is not suitable for being used as backlight. For example, the light may not have a uniform brightness distribution over the entire area of the liquid crystal display panel LCP. Alternatively, the light may not have been concentrated in a viewer direction with respect to a surface of the liquid crystal display panel LCP. Accordingly, for the light to be entirely used as backlight, it is necessary to concentrate and diffuse the light.

For such a function, the optical film OPT is disposed between the light guide plate LG and the liquid crystal display panel LCP. The structure of the optical films OPT according to the related art is described below with reference to FIGS. 3 to 6. FIG. 3 is a cross-sectional view showing the structure of optical films including a diffusion film in a liquid crystal display according to the related art.

The optical films OPT disposed under the liquid crystal display panel LCP of FIG. 3 have a stacked structure, which is widely used. For example, the optical films OPT may have a structure in which a lower prism sheet PRL, an upper prism sheet PRU, and a diffusion sheet DIF have been sequentially stacked.

Trigonal prism patterns are disposed in parallel on the top surface of the lower prism sheet PRL. More specifically, a concave peak portion and a convex valley portion are alternately disposed on the lower prism sheet PRL. Pointed peak portions are arranged in parallel in a first direction. The upper prism sheet PRU may also have the same prism pattern as the lower prism sheet PRL. In this case, the tops of the upper prism sheet PRU are disposed in parallel in a second direction orthogonal to the first direction. Light emitted from the light guide plate LG is concentrated in the form of a Gaussian distribution with respect to a normal line for the surface of the liquid crystal display panel LCP, while passing through the lower prism sheet PRL and the upper prism sheet PRU.

The diffusion sheet DIF functions to distribute pieces of light passing through the prism sheets PRL and RPU so that the pieces of light have a uniform brightness distribution over the entire surface of the liquid crystal display panel LCP. For example, in the case of the edge-type backlight unit, a side face in which the light source is positioned may have brighter brightness than a side face opposite the side face in which the light source is positioned. Furthermore, in the case of the direct-type backlight unit, a portion in which the light source is positioned may have a brighter brightness than the surrounding portion of the light source. The diffusion sheet DIF functions to uniformly diffuse a brightness distribution of light that is not uniform with respect to the entire surface of the liquid crystal display panel LCP. For such a diffusion function, beads BD may have been distributed to the top surface of the diffusion sheet DIF.

Light becomes suitable for being used as backlight by the prism sheets PRL and RPU and the diffusion sheet DIF, but there may be a problem in that brightness is deteriorated while the light passes through the optical films. This becomes a cause for deteriorating energy efficiency required to generate backlight. More specifically, brightness is significantly reduced due to the diffusion sheet DIF. In order to solve such a problem, there has been proposed a high brightness diffusion film DBEF. FIG. 4 is a cross-sectional view showing the structure of optical films including a high brightness diffusion film DBEF in a liquid crystal display according to the related art.

The high brightness diffusion film DBEF has a high refraction layer and a low refraction layer stacked thereon, and thus solves a problem in that brightness is reduced by reflecting light lost by reflection to its top surface again. FIG. 4 has the same structure as FIG. 3 except that the high brightness diffusion film DBEF has been disposed in lieu of the diffusion film DIF.

As described above, the optical films according to the related art have a structure in which they have been sequentially stacked between the liquid crystal display panel LCP and the light guide plate LG. That is, the upper prism sheet PRU is disposed on the lower prism sheet PRL in the lay-down state. Accordingly, a specific air layer is present between the upper prism sheet PRU and the lower prism sheet PRL. The air layer has a refractive index different from that of the prism sheets PRL and RPU, and thus an effect that pieces of light passing through the prism sheets PRL and RPU are diffused can be obtained.

Likewise, the diffusion film DIF or the high brightness diffusion film DBEF are also disposed on the upper prism sheet PRU in the lay-down state. Accordingly, an air layer is present between the upper prism sheet PRU and the diffusion film DIF or between the upper prism sheet PRU and the high brightness diffusion film DBEF. Thus, an effect can be obtained in that pieces of light are diffused while passing through the air layers.

However, a thickness is increased due to the structure in which the optical films OPT are simply stacked, which becomes an obstacle to the thinness of a liquid crystal display. An attempt is made to make the optical films OPT ultra-thin by laminating them. If the optical films OPT are simply laminated, a brightness distribution is not uniform because an air layer disappears and a diffusion effect according to the air layer cannot be obtained. Furthermore, a Moiré pattern, a rainbow Mura pattern or a pattern of a hot-spot form is generated. Furthermore, picture quality is deteriorated because moisture according to a capillary phenomenon permeates between the peaks of a prism sheet. Such irregular brightness, pattern generation, and moisture penetration are evaluated as being a level in which light cannot be suitably used as backlight, preventing a liquid crystal display from becoming ultra-thin.

SUMMARY

Accordingly, the present invention is directed to a liquid crystal display and a method of manufacturing the same that substantially obviate one or more of the problems due to limitations and disadvantages of the related art.

An object of the present invention is to provide an ultra-thin liquid crystal display with which an optical film has been integrated.

Another object of the present invention is to provide an ultra-thin liquid crystal display in which a stitch portion is formed between a prism sheet and a support sheet, thus being capable of improving reliability by preventing the penetration of moisture according to a capillary phenomenon.

Another object of the present invention is to provide an ultra-thin liquid crystal display with which an optical film has been integrated by laminating a lower polarizer and a prism sheet.

Another object of the present invention is to provide an ultra-thin liquid crystal display capable of preventing the deterioration of picture quality in a structure in which a liquid crystal display panel and an optical film have been laminated.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display, comprises a display panel; and an optical film on a bottom surface of the display panel, the optical film including a polarizer; a support sheet on a bottom surface of the polarizer; and a prism sheet on a bottom surface of the support sheet, the prism sheet having a base sheet, a prism portion, and a stitch portion over the base sheet, wherein the prism portion includes a plurality of peaks and has a space defined by a direct contact between the plurality of peaks of the prism portion and the bottom surface of the support sheet.

In another aspect, a method for manufacturing a liquid crystal display comprises mounting a source polarizer to which a support sheet is adhered and a first base sheet roll on respective rollers; forming a first prism sheet roll by inputting resin to a first soft mold and forming a first prism portion comprising a plurality of peaks and a first stitch portion on the first base sheet roll; fabricating an optical film comprising a space defined by a direct contact between a bottom surface of the support sheet and the plurality of peaks of the first prism portion through coalescence of the polarizer roll and the first prism sheet roll by a compression roller and cutting of the optical film; and attaching the optical film to a bottom surface of a liquid crystal display panel.

In another aspect, an optical film comprises a polarizer; a support sheet on a bottom surface of the polarizer; and a prism sheet on a bottom surface of the support sheet, the prism sheet including a base sheet, a prism portion, and a stitch portion formed over the base sheet, wherein the prism portion has a plurality of peaks and has a space defined by a direct contact between the plurality of peaks of the prism portion and the bottom surface of the support sheet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 17 is a table showing the results of water immersion tests of an optical film according to the comparative example 1 and embodiments 1 and 2 of the present disclosure.

DETAILED DESCRIPTION

Figure 5:
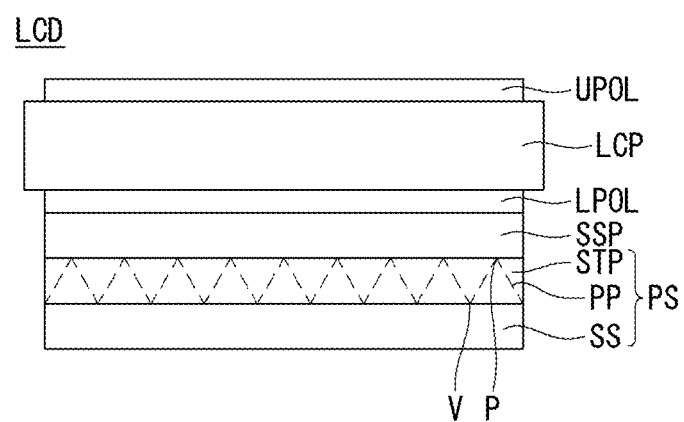
FIG. 5 is a cross-sectional view showing the structure of a liquid crystal display in which a prism sheet is laminated with a lower polarizer according to a first example embodiment of the present disclosure.
Figure 6:
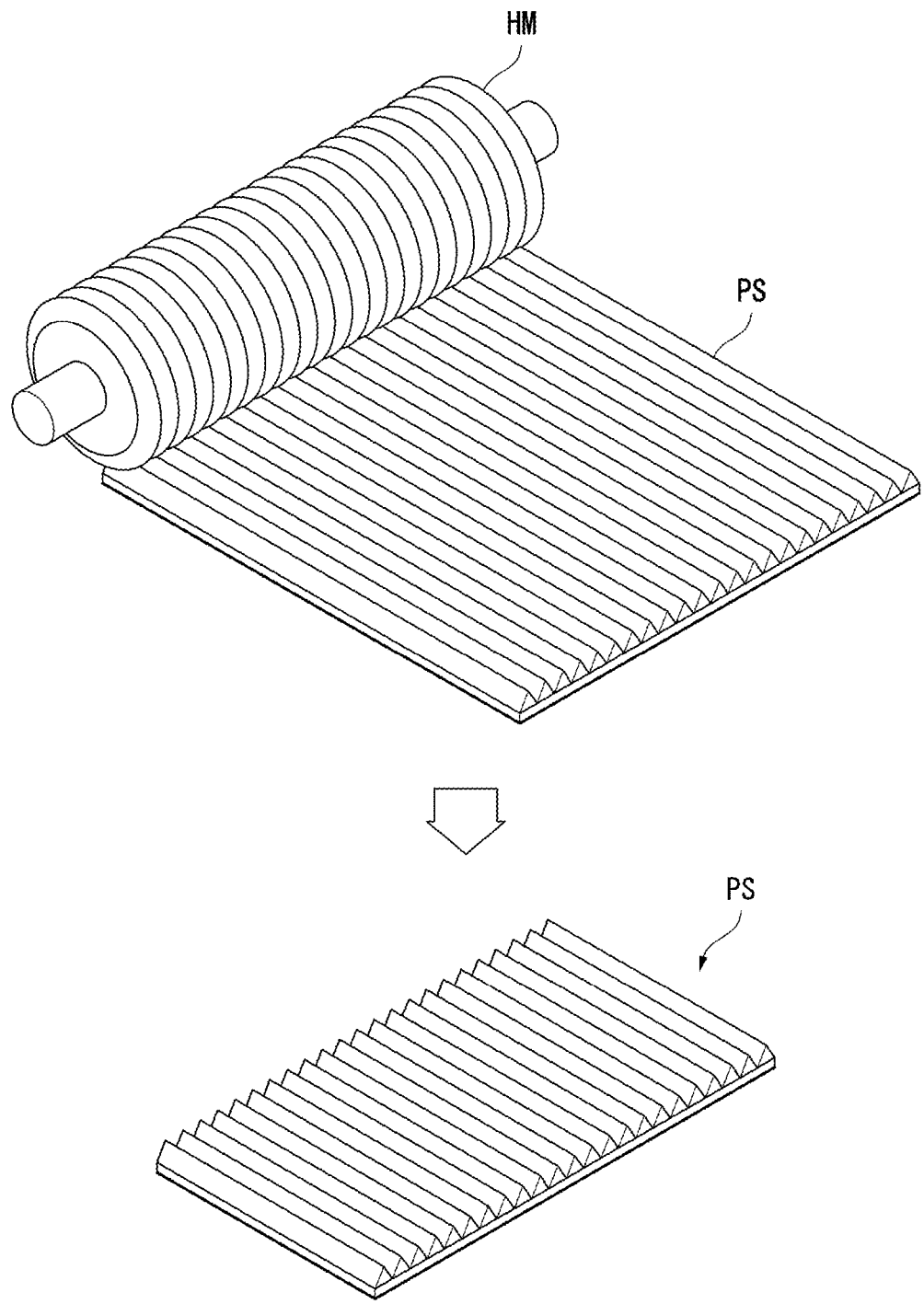
FIG. 6 is a diagram showing a process for manufacturing a prism sheet.
Figure 7:
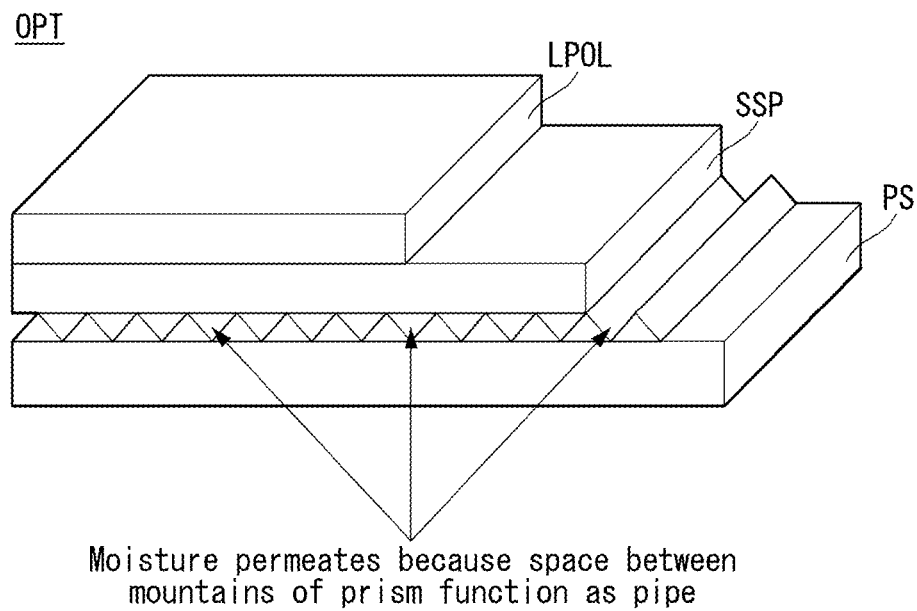
FIG. 7 is a diagram showing an optical film in which a polarizer and a prism sheet have been laminated.
Figure 8:
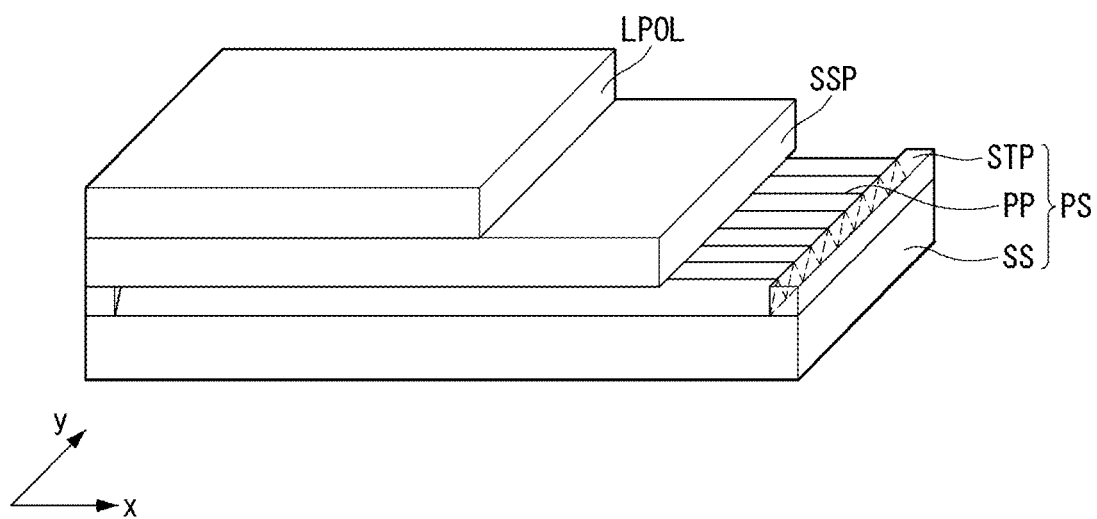
FIG. 8 is a perspective view showing a structure in which a prism sheet and a lower polarizer have been laminated according to a first embodiment of the present disclosure.
Figure 9:
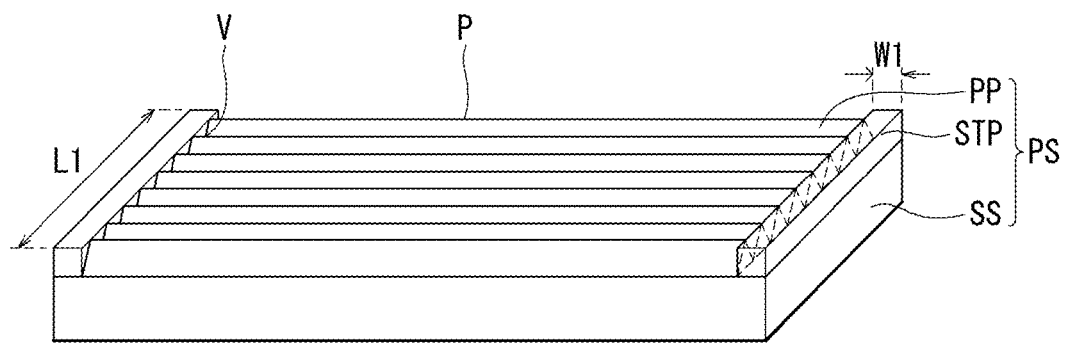
FIG. 9 is a perspective view showing a prism sheet according to the first example embodiment of the present disclosure.
Figure 10:
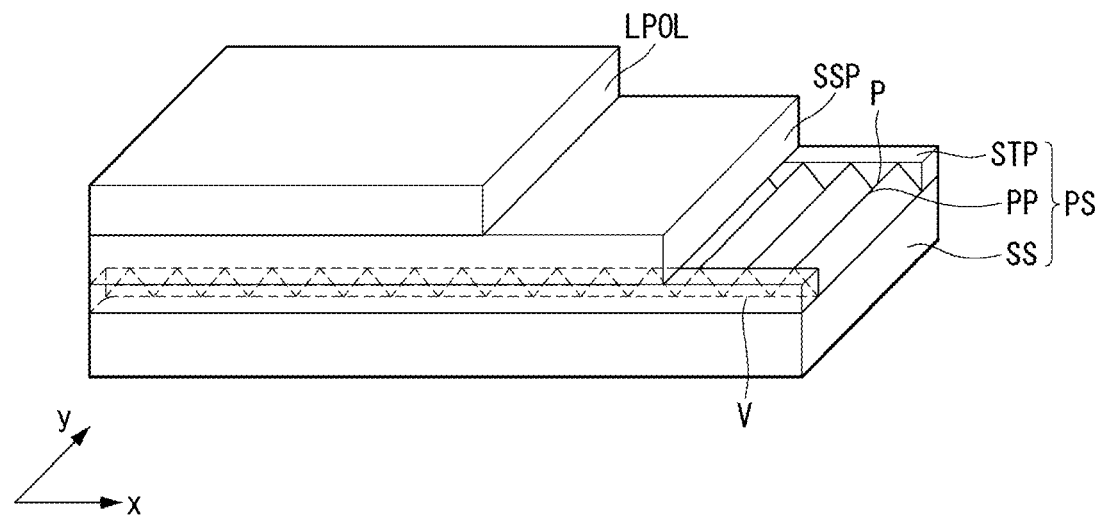
FIG. 10 is a perspective view showing another structure in which a prism sheet and a lower polarizer have been laminated according to the first example embodiment of the present disclosure.
Figure 11:
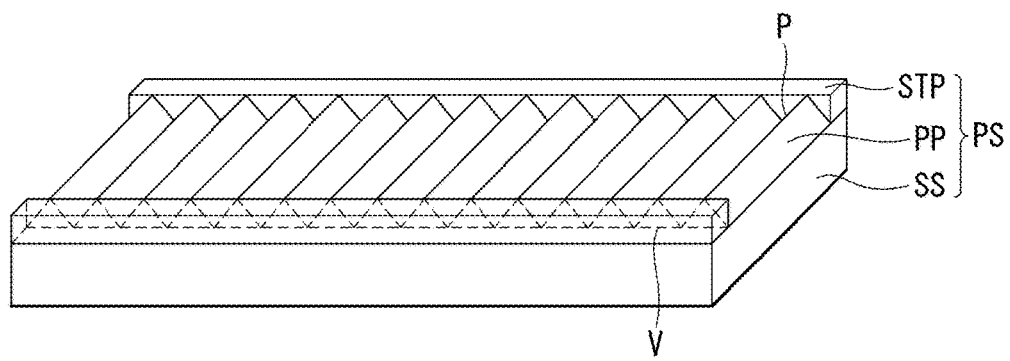
FIG. 11 is a perspective view showing a prism sheet according to the first example embodiment of the present disclosure.

Hereinafter, embodiments of the present disclosure will be described in detail with reference to the accompanying drawings. In the specification, the same reference numerals denote the same elements. In the following description, a detailed description of the known functions and constitutions will be omitted if it is deemed to make the gist of the present disclosure unnecessarily vague. Furthermore, the names of elements used in the following description have been selected by taking into consideration only the ease of writing this specification and may be different from the names of actual parts First Embodiment The first example embodiment of the present disclosure is described below with reference to FIGS. 5 to 11. FIG. 5 is a cross-sectional view showing the structure of a liquid crystal display in which a prism sheet is laminated with a lower polarizer according to a first example embodiment of the present disclosure. FIG. 6 is a diagram showing a process for manufacturing a prism sheet. FIG. 7 is a diagram showing an optical film in which a polarizer and a prism sheet have been laminated. FIG. 8 is a perspective view showing a structure in which a prism sheet and a lower polarizer have been laminated according to a first embodiment of the present disclosure. FIG. 9 is a perspective view showing a prism sheet according to the first example embodiment of the present disclosure. FIG. 10 is a perspective view showing another structure in which a prism sheet and a lower polarizer have been laminated according to the first example embodiment of the present disclosure. FIG. 11 is a perspective view showing a prism sheet according to the first example embodiment of the present disclosure.

As shown in FIG. 5, the liquid crystal display (hereinafter referred to as an "LCD") according to the first example embodiment of the present disclosure includes an LCD panel LCP, an upper polarizer UPOL, a lower polarizer LPOL, a support sheet SSP, and a prism sheet PS. The LCD panel LCP includes an upper substrate and a lower substrate having surface-coalesced with a liquid crystal layer interposed therebetween. The upper polarizer UPOL has coalesced on the top surface of the LCD panel LCP. The lower polarizer LPOL has coalesced on the bottom surface of the LCD panel LCP.

The upper polarizer UPOL has light transmission axes or light blocking axes aligned in a first direction. The lower polarizer LPOL has light transmission axes or light blocking axes aligned in a second direction. If an LCD is normally black, a first light transmission axis and a second light transmission axis may be disposed to be orthogonal to each other. In contrast, if an LCD is normally white, the first light transmission axis and the second light transmission axis may be disposed in parallel.

The lower polarizer LPOL, although not shown, includes a core layer, that is, a polarizer, and an upper protection layer and lower protection layer that have coalesced on the top and bottom surface of the core layer, respectively. The polarizer is likely to be deformed due to moisture included in the air. Accordingly, the upper protection layer and the lower protection layer have coalesced on both surfaces of the polarizer. Furthermore, a protection layer may be formed on at least one of the top and bottom surfaces of the core layer of the lower polarizer LPOL. The protection layer positioned on the top surface of the core layer may be an acrylic protection layer and the protection layer positioned on the bottom surface of the core layer may be TAC, but is not limited thereto. The lower polarizer LPOL is attached to the LCD panel LCP through an adhesive layer.

The support sheet SSP is positioned on the bottom surface of the lower polarizer LPOL. The support sheet SSP functions to transmit light incident from a light source and to adhere to the prism sheet PS. To this end, the support sheet SSP may be made of a material that can transmit light incident from the light source and has a great resistance force against moisture in the air, for example, any one selected from the group consisting of polyethylene terephthalate (PET), polycarbonate (PC), polypropylene (PP), polyethylene (PE), polystyrene (PS), and polyepoxy (PE), but is not limited thereto. The support sheet SSP may be formed to have a thin thickness in accordance with the thinness of a backlight unit, for example, a thin thickness of 10 μm to 250 μm. If the support sheet SSP is formed to have a thickness of 10 μm or more, the backlight unit can be made as thin as desired within the limit that the mechanical physical and heat-resistant properties of an optical film are not deteriorated. Furthermore, if the support sheet SSP is formed to have a thickness of 250 μm or less, the thinness of the backlight unit can be achieved and the mechanical physical and heat-resistant properties of the optical film can be maximized.

The prism sheet PS is positioned on the bottom surface of the support sheet SSP. The prism sheet PS includes a prism portion PP having prism patterns formed on a base sheet SS. The base sheet SS functions to transmit light incident from the light source and to protect the prism portion PP of the prism sheet PS. To this end, the base sheet SS may be made of a material that can transmit light incident from the light source and has a resistance force against moisture in the air, for example, any one selected from the group consisting of polyethylene terephthalate (PET), polycarbonate (PC), polypropylene (PP), polyethylene (PE), polystyrene (PS), and polyepoxy (PE), but is not limited thereto. The base sheet SS may be formed to have a thin thickness in accordance with the thinness of a backlight unit, for example, a thickness of 10 μm to 250 μm. If the base sheet SS is formed to have a thickness of 10 μm or more, the backlight unit can be made as thin as possible within the limit that the mechanical physical and heat-resistant properties of an optical film are not deteriorated. Furthermore, if the base sheet SS is formed to have a thickness of 250 μm or less, the thinness of the backlight unit can be achieved and the mechanical physical and heat-resistant properties of the optical film can also be maximized.

The prism portion PP is positioned on the base sheet SS, and can concentrate light incident from the light source by the prism patterns. The prism portion PP may be made of transparent polymer resin to transmit light incident from the light source. In this case, the polymer resin may be made of any one selected from the group consisting of polyethylene terephthalate (PET), polycarbonate (PC), polypropylene (PP), polyethylene (PE), polystyrene (PS), and polyepoxy (PE), but is not limited thereto.

With reference to FIG. 6, the prism sheet PS is formed by coating resins on the base sheet and then imprinting the base sheet using a hard mold HM on a surface of which an inverse image of a prism has been formed. The peaks of the prism are continuously formed in the prism sheet PS formed by the hard mold HM. The prism sheet PS is cut in a desired size and used.

As illustrated in FIG. 7, the fabricated prism sheet PS is attached to the support sheet SSP through adhesives, such as a UV resin, and is then laminated with the lower polarizer LPOL, thereby being fabricated into an integrated optical film OPT. However, the prism sheet PS of the optical film OPT may experience a capillary phenomenon in which moisture permeates into the space between the peaks of the prism sheet PS because the space between the peaks is exposed to an external environment having moisture. If the capillary phenomenon is generated, and the optical film OPT into which moisture has permeated is applied to the LCD, a fatal problem, such as deterioration picture quality, may result.

Accordingly, the prism sheet PS according to an embodiment of the present disclosure further includes a stitch portion STP formed on the base sheet SS, as shown in FIG. 5. The stitch portion STP is positioned at least at both edges of the prism sheet PS, and prevents the valley V between a peak P and another peak P of the prism portion PP from being exposed to the outside.

For example, with reference to FIGS. 8 and 9, the stitch portion STP is positioned in the direction vertical to the length direction of the peaks P of the prism portion PP, and fills the entrance of the valleys V between a peak P and another peak P of the prism portion PP. When the support sheet SSP is laminated on the prism sheet PS, a path along which external moisture may permeate between a peak P and another peak P of the prism portion PP is completely blocked. For example, the peaks P of the prism portion PP are attached to the support sheet SSP on both sides parallel to the length direction of the prism portion PP, thereby blocking the path along which moisture permeates. The stitch portion STP is attached to the support sheet SPS on both sides vertical to the length direction of the prism portion PP, thereby blocking the path along which moisture permeates. Accordingly, external moisture can be prevented from permeating through the valley V between a peak P and another peak P due to a capillary phenomenon because the stitch portion STP is formed in the direction vertical to the length direction of the prism portion PP of the prism sheet PS to fill the valley V between a peak P and another peak P of the prism portion PP.

The stitch portion STP includes a length L1 vertical to the length direction of the peaks P of the prism portion PP and a width W1 in the length direction of the peaks P of the prism portion PP. The length L1 of the stitch portion STP has the same length as the prism sheet PS so that all of the valleys V of the prism portion PP that are exposed to the outside are filled. The stitch portion STP has a width W1 of at least 1 mm or more to prevent external moisture from permeating into the inside through the stitch portion STP. Display quality of the LCD panel LCP is not deteriorated because the stitch portion STP is positioned at the bezel area of the LCD. Accordingly, the width W1 of the stitch portion STP may be smaller than the width of the bezel area of the LCD and the width of the bezel area is different by inches of an LCD, but the present disclosure is not specially limited.

An LCD may have a shape with a longer length and a shorter width. Furthermore, the lower polarizer LPOL, the support sheet SSP, and the prism sheet PS also have a shape in which a length is long and a breadth is short. In this case, in FIG. 8, the "length" refers to an x-axis and the "breadth" refers to a y-axis. The peaks P of the prism sheet PS may have the length direction arranged in parallel to the length direction of the prism sheet PS, and the prism sheet PS of the stitch portion STP may have their breadth directions arranged in parallel. Accordingly, the stitch portion STP is disposed in accordance with the bezel in the breadth direction of the LCD.

With reference to FIGS. 10 and 11, in a prism sheet PS according to an example embodiment of the present disclosure, the length directions of the peaks P are arranged in parallel to the breadth/width direction of the prism sheet PS. The stitch portion STP may be arranged in parallel to the length direction of the prism sheet PS to fill the valley V between the peak P and another peak P arranged in the breadth direction. In the prism sheet PS according to an embodiment of the present disclosure, if the stitch portion STP is positioned in the direction vertical to the length direction of the peaks P of the prism portion PP, it may be positioned in any direction of the LCD panel, but the present disclosure is not limited to this arrangement.

Furthermore, the peaks P of the prism portion PP of the prism sheet may overlap or may be spaced apart from each other. Furthermore, the peaks P of the prism portion PP may have a continuous or discontinuous pattern. Furthermore, the peaks P of the prism portion PP may have a constant height or may vary in the length direction, and the valleys V of the prism portion PP may have a constant depth or may vary in the length direction. Furthermore, a pitch between adjacent peaks P of the prism portion PP may be constant or may vary. However, the present disclosure is not limited thereto, and the prism portion PP having various lengths and shapes may be formed by known methods.

Figure 1:
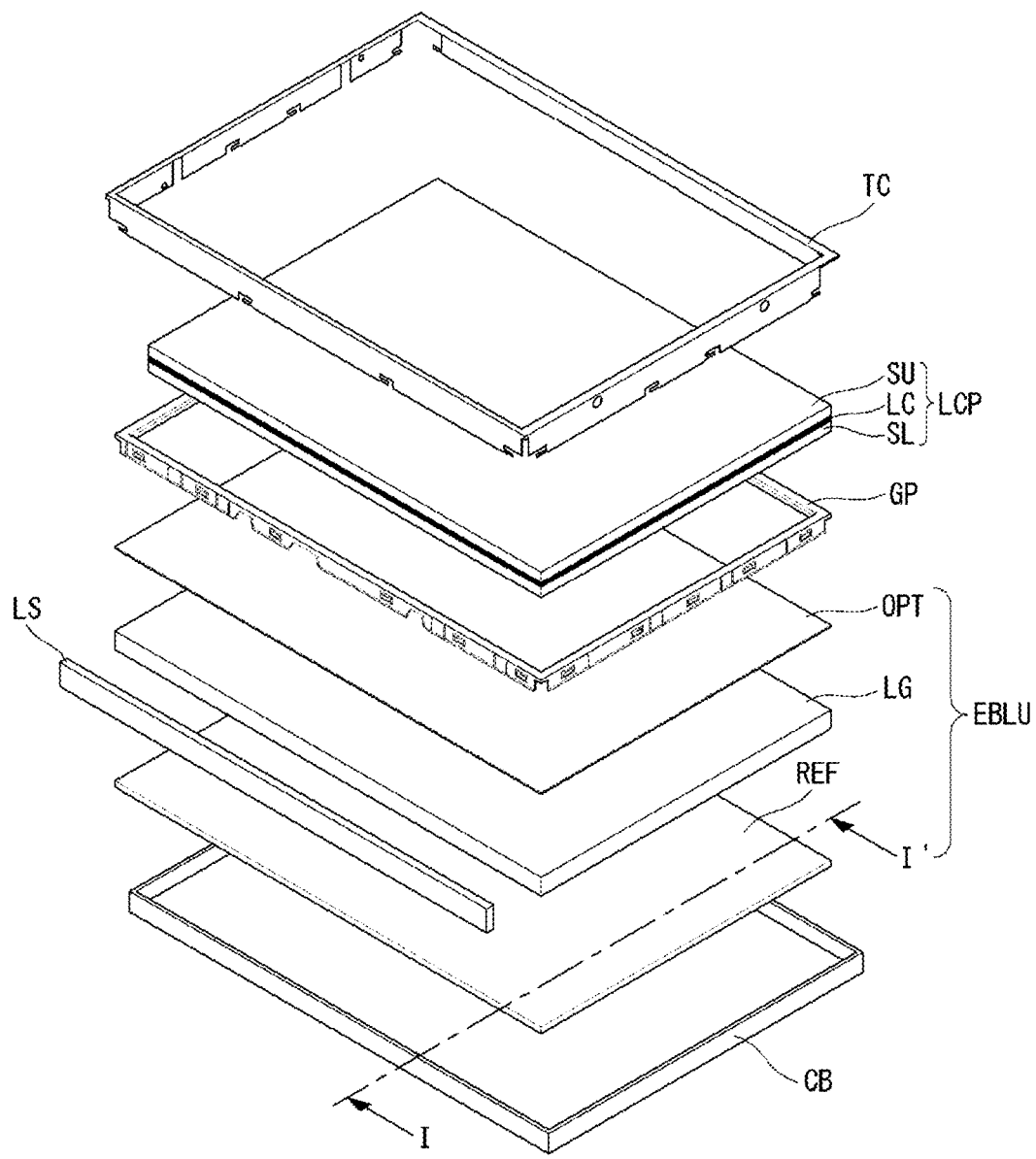
FIG. 1 is an exploded perspective view showing the structure of a liquid crystal display including an edge-type backlight unit according to a technology of the related art.
Figure 2:
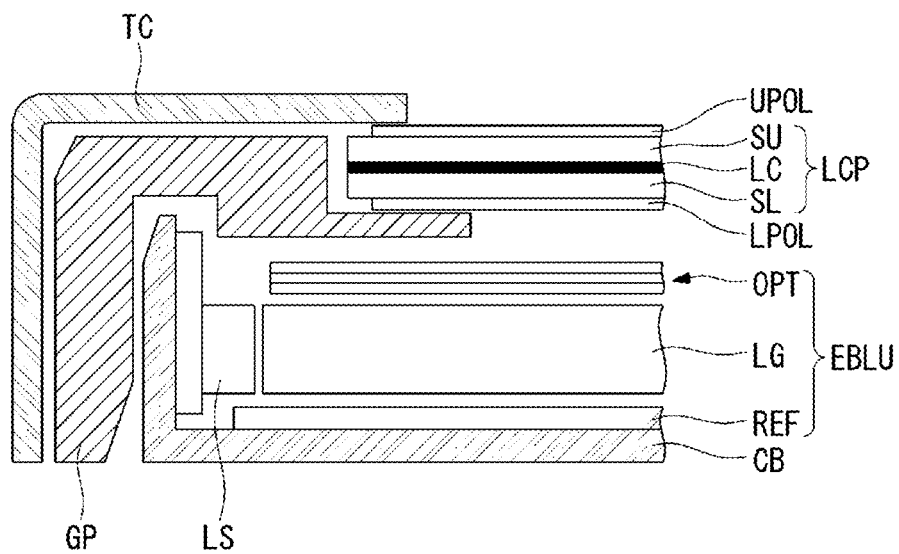
FIG. 2 is a cross-sectional view showing the structure of the liquid crystal display including an edge-type backlight unit according to the related art taken along line I-I' of FIG. 1.
Figure 3:
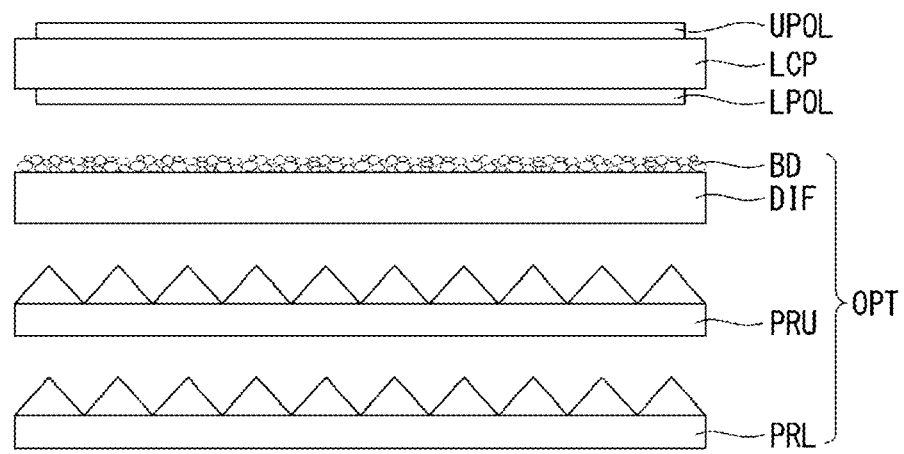
FIG. 3 is a cross-sectional view showing the structure of optical films including a diffusion film in a liquid crystal display according to the related art.
Figure 4:
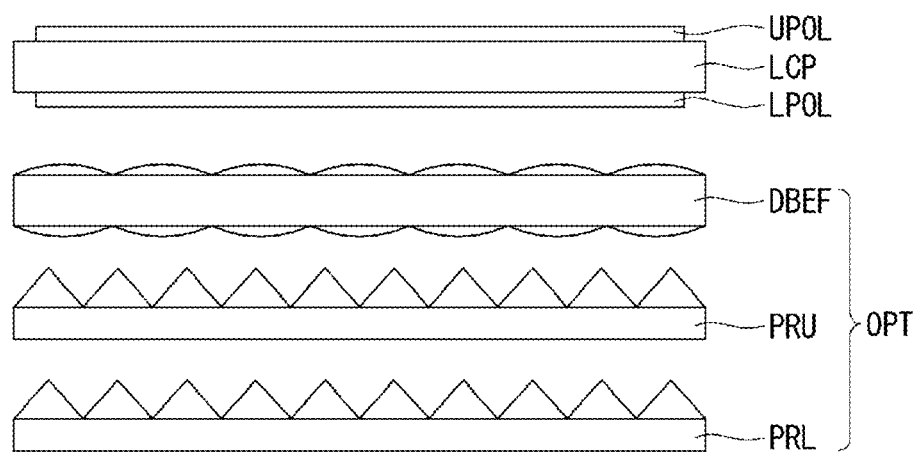
FIG. 4 is a cross-sectional view showing the structure of optical films including a high brightness diffusion film in a liquid crystal display according to the related art.

Furthermore, the LCD may include a backlight unit under the LCD panel LCP with which the optical film OPT has coalesced. The backlight unit may be the backlight unit shown in FIG. 1. The backlight unit may include the light source LS, the light guide plate LG, and the reflection plate. More specifically, in an example embodiment of the present disclosure, the backlight unit may not include a separate optical film, but instead may include an optical film attached to the LCD panel LCP. In this case, the backlight unit may further include an additional optical film, such as a diffusion sheet. Accordingly, light from the backlight unit under the LCD panel LCP can be provided to the LCD panel LCP.

A method for manufacturing the prism sheet according to the first embodiment of the present disclosure is described below.

Figure 12:
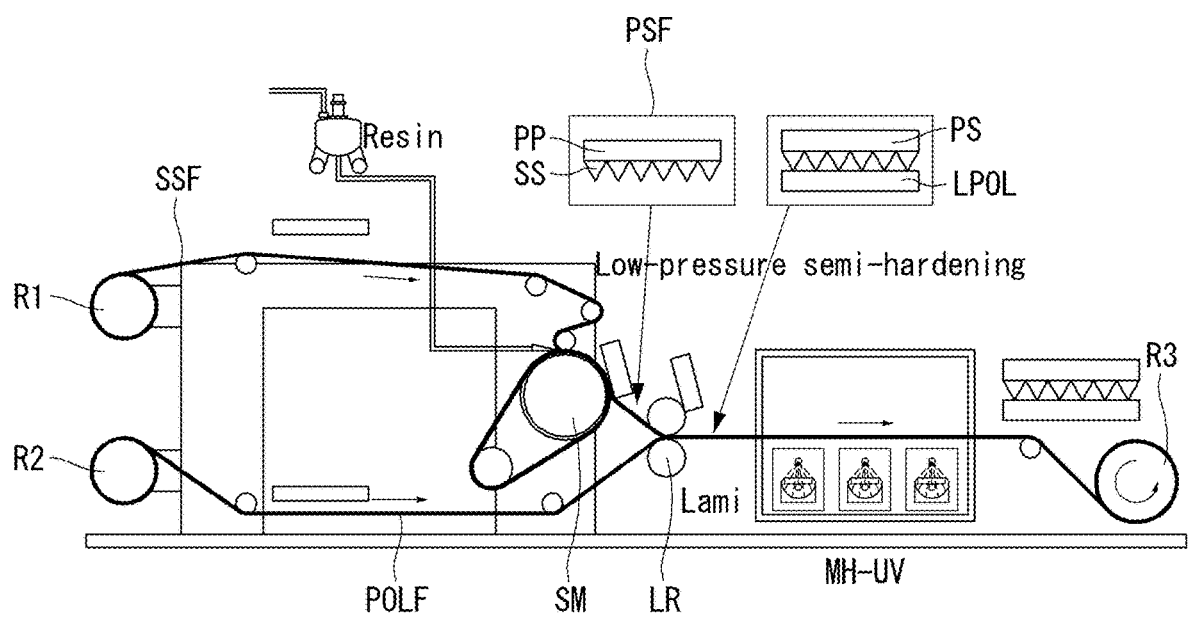
FIG. 12 is a diagram showing the manufacturing of a prism sheet and a process for laminating a prism sheet and a polarizer according to the first example embodiment of the present disclosure.
Figure 13:
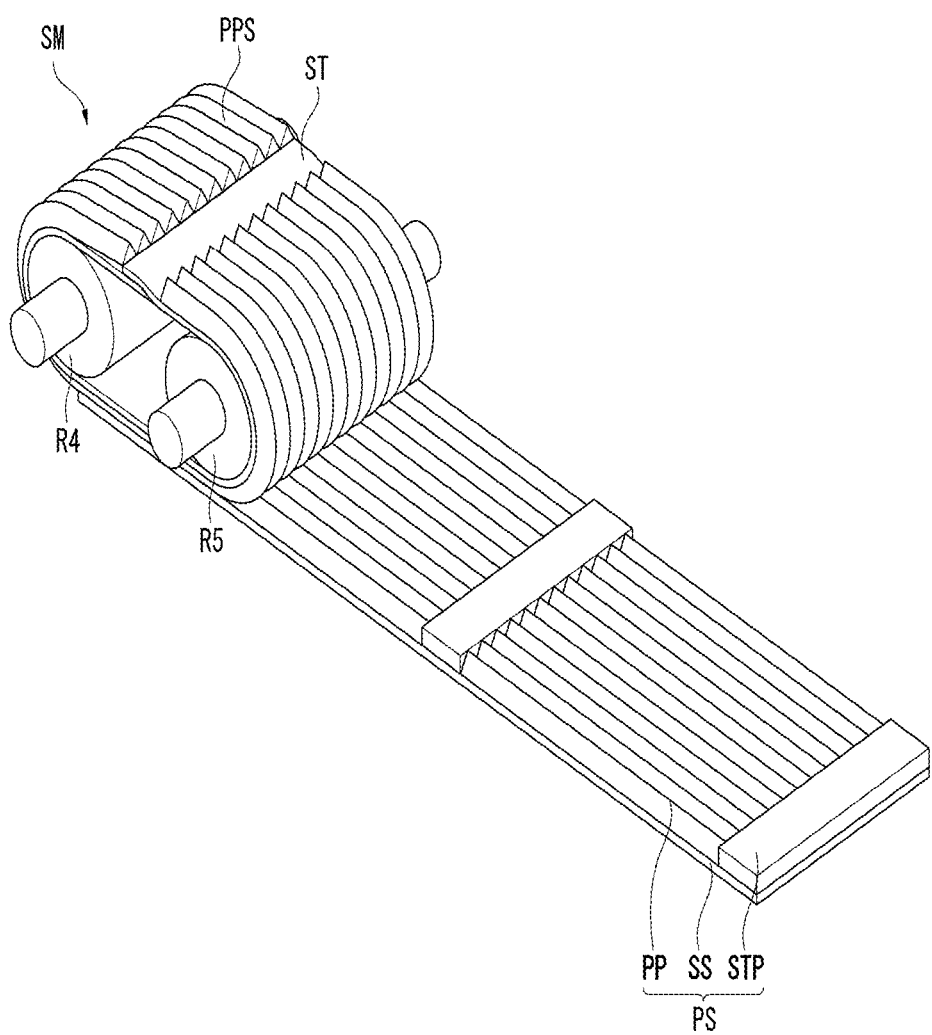
FIGS. 13 and 14 are diagrams showing a prism sheet fabricated according to the structure of a soft mold.
Figure 14:
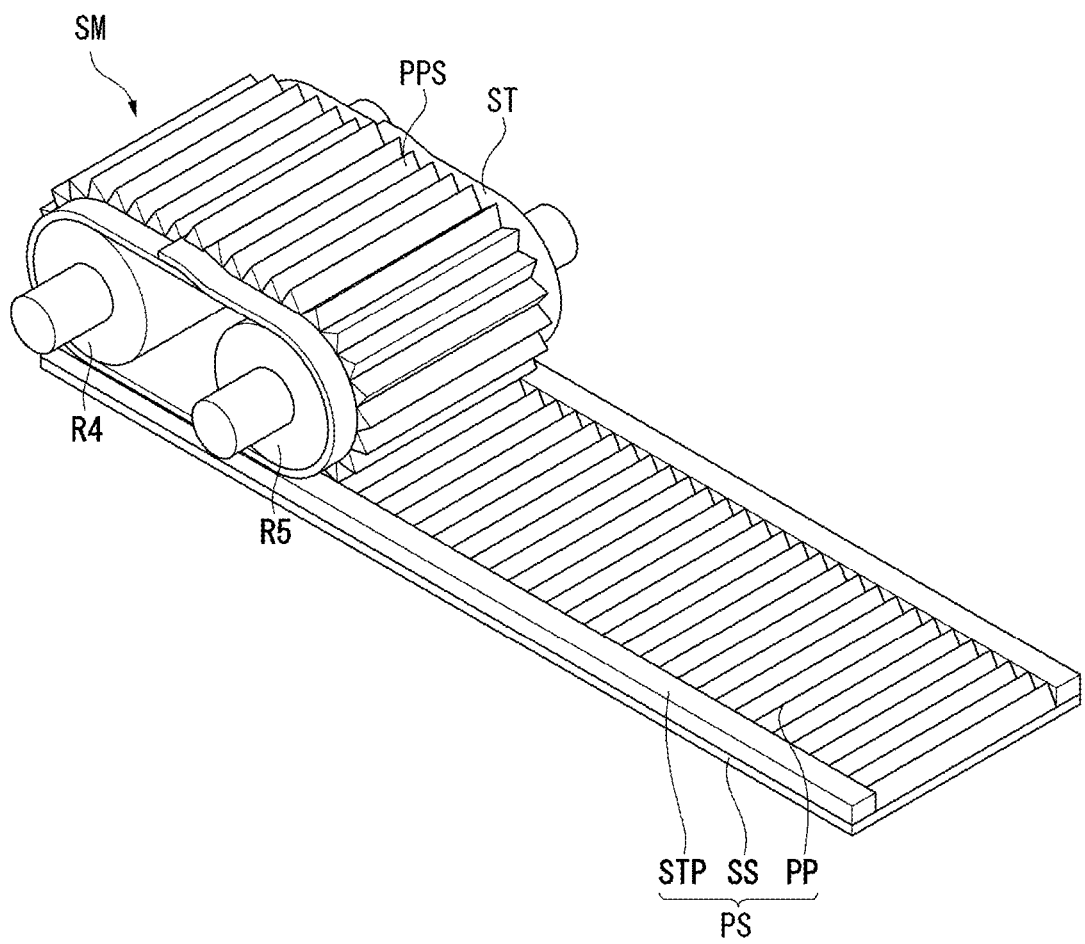

FIG. 12 is a diagram showing the manufacturing of a prism sheet and a process for laminating the prism sheet and a polarizer according to the first example embodiment of the present disclosure. FIGS. 13 and 14 are diagrams showing the prism sheet fabricated according to the structure of a soft mold.

In FIG. 12, the base sheet roll SSF of a prism sheet is mounted on a first roller R1, a source polarizer POLF to which a support sheet has adhered is mounted on a second roller R2, and resin inputted to a soft mold SM is prepared. The prism sheet having to-be-formed prism patterns formed thereon is wound and mounted on the soft mold SM. Although not shown, when the prism sheet is wound on the soft mold SM, the ends of the prism sheet are attached, thus forming a stitch adhesion unit in which a prism pattern is not formed. The stitch adhesion unit is described in detail later.

Next, the base sheet roll SSF is transferred to the soft mold SM by rotating the first roller R1, and resin is inputted. The base sheet roll SSF is coated with the resin, and the resin is compressed by the soft mold SM, thereby forming the prism portion PP and the stitch portion (not shown). When the prism portion PP and the stitch portion (not shown) are formed on the base sheet roll SSF, semi-hardening is performed at low pressure, thereby fabricating a prism sheet roll PSF. The polarizer roll POLF is transferred to the compression roller LR by rotating the second roller R2. In this case, prior to a compression roller LR, UV adhesives are coated so that the prism sheet roll PSF and the polarizer roll POLF are compressed and attached.

Next, the prism sheet roll PSF and the polarizer roll POLF are compressed by the compression roller LR at the same time and thus laminated. The laminated optical film is subjected to ultraviolet hardening (MH-UV) and wound and received in a third roller R3. The optical film fabricated as described above is cut in a required size, attached to the bottom surface of an LCD, and used.

A method for fabricating the stitch portion included in the prism sheet according to an embodiment of the present disclosure is described below. As shown in FIG. 13, the soft mold SM includes fourth and fifth rollers R4 and R5. A prism pattern sheet PPS has been wound on the fourth and the fifth rollers R4 and R5. The prism pattern sheet PPS has an inverse image of a prism pattern to be formed on the prism sheet. After the prism pattern sheet PPS is wound on the fourth and the fifth rollers R4 and R5, a stitch adhesion unit ST adhered to both edges of the prism pattern sheet PPS is formed to fix the wound prism pattern sheet PPS. A prism pattern is not formed on the stitch adhesion unit ST.

After resin is inputted to the soft mold MS, when the fourth and the fifth rollers R4 and R5 are rotated, the prism pattern sheet PPS compresses the base sheet SS coated with the resin. When the prism pattern of the prism pattern sheet PPS is compressed on the resin, the prism portion PP is formed on the base sheet SS. Furthermore, when the stitch adhesion unit ST of the prism pattern sheet PPS is compressed on the resin, the stitch portion STP on which a prism pattern is not formed and a flat resin layer is present is formed.

In this case, when the prism pattern sheet PPS is wound on the fourth and fifth rollers R4 and R5 of the soft mold SM, the length direction of the peaks P of the prism of the prism pattern sheet PPS may be disposed in parallel to the rotation direction of the fourth and the fifth rollers R4 and R5, and the stitch adhesion unit ST of the prism pattern sheet PPS may be disposed in the direction vertical to the rotation direction of the fourth and the fifth rollers R4 and R5. Accordingly, the length direction of the peaks P of the prism portion PP formed on the prism sheet PS may become parallel to or identical with the length direction of the peaks P of the prism of the prism pattern sheet PPS, and the direction of the stitch portion STP formed on the prism sheet PS may become vertical to the length direction of the peaks P of the prism.

In contrast, as illustrated in FIG. 14, when the prism pattern sheet PPS is wound on the fourth and fifth rollers R4 and R5 of the soft mold MS, the length direction of the peaks P of the prism of the prism pattern sheet PPS may be disposed in the direction vertical to the rotation direction of the fourth and the fifth rollers R4 and R5, and the stitch adhesion unit ST of the prism pattern sheet PPS may be disposed in parallel to the rotation direction of the fourth and the fifth rollers R4 and R5. Accordingly, the length direction of the peaks P of the prism portion PP formed on the prism sheet PS may become vertical to the length direction of the peaks P of the prism of the prism pattern sheet PPS, and the stitch portion STP formed on the prism sheet PS may become parallel to or identical with the length direction of the peaks P of the prism.

As described above, the LCD including the prism sheet according to the first example embodiment of the present disclosure can prevent external moisture from permeating into a valley due to a capillary phenomenon because the valley formed between the peaks of the prism sheet is filled with the stitch portion. Accordingly, reliability can be improved because a display failure of an LCD is prevented from occurring.

Second Embodiment

Figure 15:
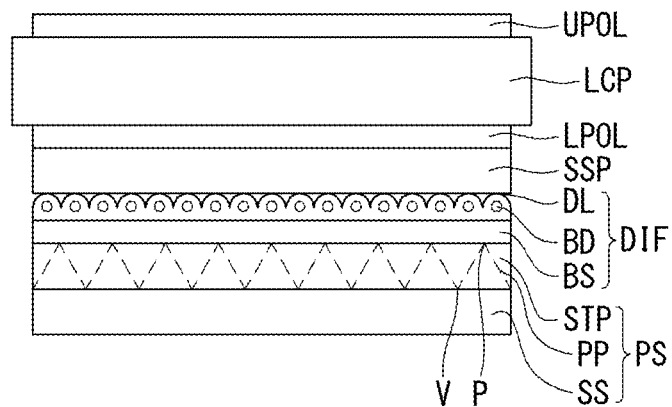
FIG. 15 is a cross-sectional view showing a liquid crystal display according to a second example embodiment of the present disclosure.

A LCD according to a second example embodiment of the present disclosure will be described below with reference to FIG. 15. FIG. 15 is a cross-sectional view showing an LCD according to the second example embodiment of the present disclosure.

With reference to FIG. 15, the LCD may include an LCD panel LCP, an upper polarizer UPOL, a lower polarizer LPOL, a support sheet SSP, a diffusion sheet DIF, and a prism sheet PS. Unlike the LCD according to the first example embodiment, the LCD may further include the diffusion sheet DIF between the support sheet SSP and the prism sheet PS. The diffusion sheet DIF functions to distribute pieces of light passing through the prism sheet PS so that they have a uniform brightness distribution over the entire surface of the LCD panel LCP. For example, in the case of the edge-type backlight unit, a side face in which a light source is positioned may have a brighter brightness than a side face opposite the side face in which a light source is positioned. Furthermore, in the case of the direct-type backlight unit, a portion in which a light source is positioned may have a brighter brightness than the surrounding portion of the light source. The diffusion sheet DIF uniformly diffuses a brightness distribution of light that is not uniform over the entire surface of the LCD panel LCP.

More specifically, the diffusion sheet DIF is integrated with the lower polarizer LPOL, the support sheet SSP, and the prism sheet PS through lamination. The diffusion sheet DIF includes a base sheet BS and a diffusion layer DL coated with beads BD formed on the base sheet BS.

The base sheet BS functions to transmit light incident from a light source and to support the diffusion sheet DIF. To this end, the base sheet BS may be made of a material that can transmit light incident from the light source and that has a resistance force against moisture in the air, for example, any one selected from the group consisting of polyethylene terephthalate (PET), polycarbonate (PC), polypropylene (PP), polyethylene (PE), polystyrene (PS), and polyepoxy (PE), but is not limited thereto. The base sheet BS may be formed to have a thin thickness in accordance with the thinness of a backlight unit, for example, a thickness of 10 µm to 250 µm. If the base sheet BS is formed to have a thickness of 10 µm or more, the backlight unit can be made thin as much as possible within the limit that the mechanical physical and heat-resistant properties of the optical film are not deteriorated. Furthermore, if the base sheet BS is formed to have a thickness of 250 µm or less, a thin profile backlight unit can be achieved, and the mechanical physical and heat-resistant properties of the optical film can also be maximized.

The diffusion layer DL coated with the beads BD is formed on the top surface of the base sheet BS. The diffusion layer DL has the plurality of beads BD distributed in resin. Resin that is transparent and has excellent heat-resistant and mechanical characteristics may be used as the resin. For example, polyethylene terephthalate (PET), polycarbonate (PC), polycarbonate (PC) alloy, polystyrene (PS), heat-resistant polystyrene (PS), polymethylmetaacrylate (PMMA), polybutylene terephtalate (PBT), polypropylene (PP), polyethylene (PE), acrylonitrile butadiene styrene (ABS), polyurethane (PU), polyimide (PI), polyvinyl chloride (PVC), a stylene acrylonitrile mixture (SAN), ethylene-vinyl acetate (EVA), polyamide (PA), polyacetal (POM), phenol, epoxy (EP), urea (UF), melanin (MF), unsaturated polyesters (UP), silicon (Si), or cycloolefinepolymer may be used as the resin.

The plurality of beads BD may be fabricated using resin that is the same kind as the aforementioned resin or different from the aforementioned resin. 10 to 50 weight % of the plurality of beads BD may be included in the resin. The size of the bead BD may be properly selected depending on the thickness of the resin, and may be 1 to 10 µm. The beads BD may have substantially the same size, and a distribution of the beads BD may also be regular within the resin. Alternatively, the beads BD may have different sizes, and a distribution of the beads BD may be irregular within the resin.

Although not shown, a protection layer including a plurality of beads may be positioned on the bottom surface of the diffusion sheet DIF, but the present disclosure is not limited thereto. The prism sheet PS is positioned under the diffusion sheet DIF. The prism sheet PS has a structure in which a prism portion PP and a stitch portion STP have been formed in on a base sheet SS, and has the same configuration as the prism sheet PS according to the first example embodiment. The prism sheet PS has been described in detail in connection with the first embodiment, and a description thereof is omitted.

In the LCD according to the second example embodiment of the present disclosure, a lower polarizer roll to which a support sheet roll, a diffusion sheet roll, and a prism sheet roll are laminated at the same time, and the lower polarizer roll, the support sheet roll, the diffusion sheet roll, and the prism sheet roll are laminated to form an integrated optical film. The fabricated optical film is cut in a required size, attached to the bottom surface of the LCD, and used.

Here, the diffusion sheet DIF has been illustrated as being included between the lower polarizer LPOL and the prism sheet PS, but the present disclosure is not limited thereto. For example, the diffusion sheet DIF may be positioned under the prism sheet PS and may be integrated with the lower polarizer LPOL, the support sheet SSP, and the prism sheet PS.

The LCD according to the second example embodiment may have an advantage in that an integrated optical film can be fabricated by laminating the lower polarizer, the support sheet, the diffusion sheet, and the prism sheet. Furthermore, external moisture can be prevented from permeating through a valley due to a capillary phenomenon by filling the valley formed between the peaks of the prism sheet with the stitch portion. Accordingly, reliability can be improved because a display failure of an LCD is prevented from occurring.

Third Embodiment

Figure 16:
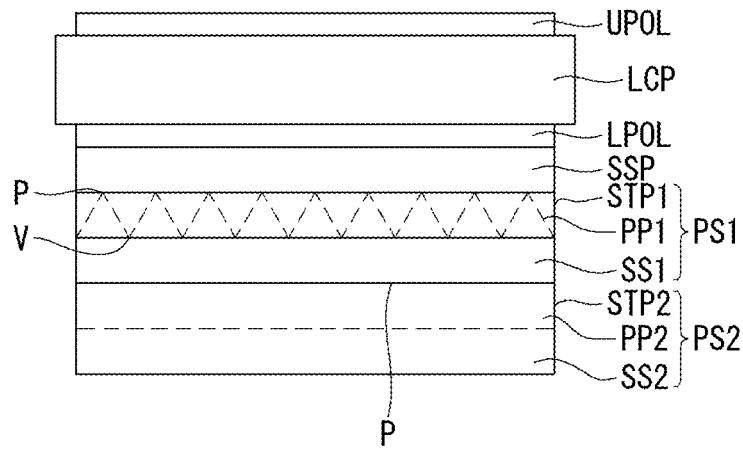
FIG. 16 is a cross-sectional view showing a liquid crystal display according to a third example embodiment of the present disclosure.

An LCD according to a third example embodiment of the present disclosure with be described below with reference to FIG. 16. FIG. 16 is a cross-sectional view showing the LCD according to the third example embodiment of the present disclosure.

As illustrated in FIG. 16, the LCD may include an LCD panel LCP, an upper polarizer UPOL, a lower polarizer LPOL, a support sheet SSP, a first prism sheet PS1, and a second prism sheet PS2. Unlike the LCDs according to the first and second example embodiments, the LCD of the third example embodiment may include the first prism sheet PS1 and the second prism sheet PS2 under the support sheet SSP.

The first prism sheet PS1 has a structure in which a first prism portion PP1 having a plurality of prism patterns disposed therein and a first stitch portion STP1 formed to fill the valleys V of the first prism portion PP1 are formed on a first base sheet SS1. Furthermore, the second prism sheet PS2 also has a structure in which a second prism portion PP2 having a plurality of prism patterns disposed therein and a second stitch portion STP2 formed to fill the valleys of the second prism portion PP2 are formed on a second base sheet SS2. Each of the elements has been described above, and a description thereof is omitted.

In the first prism sheet PS1, the length direction of the peaks P of the first prism portion PP1 is disposed in a y-axis direction, and the first stitch portion STP1 is disposed in an x-axis direction. In the second prism sheet PS2, the length direction of the peaks P of the second prism portion PP2 is disposed in the x-axis direction, and the second stitch portion STP2 is disposed in the y-axis direction. That is, the length direction of the peaks P of the first prism sheet PS1 and the length direction of the first stitch portion STP1 are vertical to the length direction of the peaks P of the second prism sheet PS2 and the length direction of the second stitch portion STP2. Accordingly, light incident from a light source can be concentrated in the form of a Gaussian distribution with respect to a normal line for a surface of the LCD panel LCP while passing through the first prism sheet PS1 and the second prism sheet PS2.

In the LCD, regarding the lower polarizer LPOL, the support sheet SSP, the first prism sheet PS1, and the second prism sheet PS2, after each of a first prism sheet roll and a second prism sheet roll is formed using a soft mold, the first prism sheet roll and the second prism sheet roll, together with a source lower polarizer to which a source support sheet has adhered, are laminated at the same time. The source lower polarizer, the source support sheet, the first prism sheet roll, and the second prism sheet roll are laminated to form an integrated optical film. The fabricated optical film is cut in a desired size, attached to the bottom surface of an LCD, and used.

In the LCD configured as such, an integrated optical film can be fabricated by laminating the lower polarizer, the support sheet, the first prism sheet, and the second prism sheet. Furthermore, external moisture can be prevented from permeating into a valley due to a capillary phenomenon by filling the valley formed between the peaks of the prism sheet with the stitch portion. Accordingly, reliability can be improved because a display failure of an LCD is prevented.

Figure 18:
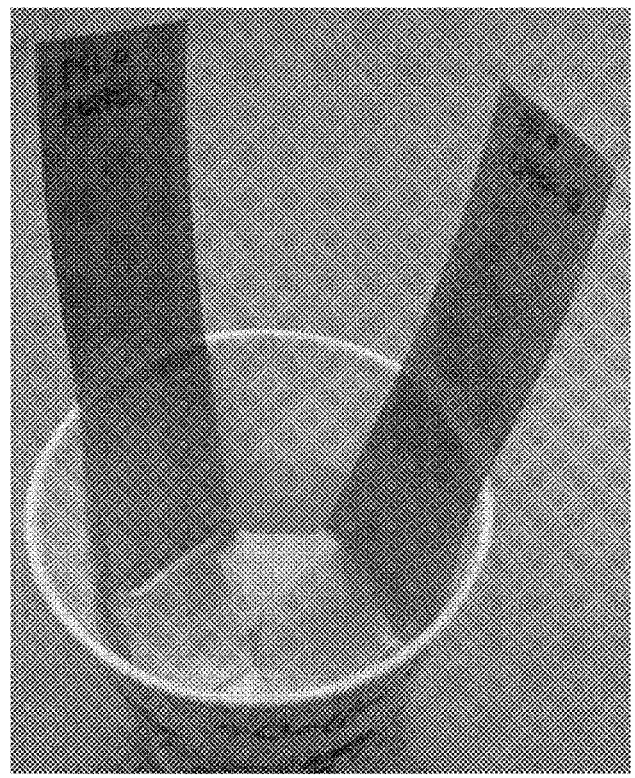
FIG. 18 shows an image of a water immersion test.
Figure 19:
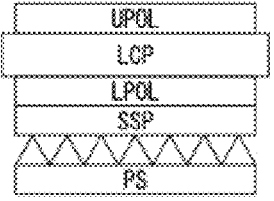
FIG. 19 is a table showing the results of high-temperature/high humidity evaluation of a liquid crystal display according to the comparative example 2 and embodiments 3 and 4 of the present disclosure.

Experimental data regarding the optical characteristics of LCDs according to comparative examples and embodiments of the present disclosure are described below. FIG. 17 is a table showing the results of water immersion tests of an optical film according to comparative example 1 and example embodiments 1 and 2 of the present disclosure. FIG. 18 shows an image of a water immersion test. FIG. 19 is a table showing the results of high temperature/high humidity evaluation of a liquid crystal display according to comparative example 2 and embodiments 3 and 4 of the present disclosure. In this case, the LCD according to comparative example 2 included an optical film according to comparative example 1, and the LCD according to the third embodiment included the optical film according to the second embodiment.

With reference to FIGS. 17 and 18, a capillary phenomenon was strongly generated through a valley of the prism sheet, and thus moisture permeated into the optical film in comparative example 1. In the optical film according to the first example embodiment, the width of the stitch portion was 0.5 mm. A small amount of moisture permeated into the optical film due to a capillary phenomenon that was partially generated through a valley of the prism. In contrast, in the optical film according to the second embodiment, the width of the stitch portion was 1 mm, a capillary phenomenon was not generated, and thus, moisture did not permeate into the optical film.

Furthermore, with reference to FIG. 19, as the results of the evaluation of high temperature/high humidity of the LCD according to the comparative example 2, a capillary phenomenon was generated through a valley of the prism, and thus, moisture permeated into the optical film. In contrast, as the results of high-temperature/high humidity evaluation of the LCD according to the third example embodiment, a capillary phenomenon was not generated and moisture never permeated into the optical film.

It can be seen from the results that a capillary phenomenon can be prevented. Thus, the permeation of moisture can be prevented by forming the stitch portion in the prism sheet to block a path along which moisture permeates. For example, the LCD according to the embodiments of the present disclosure can prevent the permeation of external moisture through a valley due to a capillary phenomenon by filling the valley formed between the peaks of the prism sheet with the stitch portion. Accordingly, a display failure of an LCD can be prevented from occurring, and thus, reliability can be improved.

It will be apparent to those skilled in the art that various modifications and variations can be made in the liquid crystal display and method for manufacturing the same of the present invention without departing from the spirit or scope of the invention. Thus, it is intended that the present invention cover the modifications and variations of this invention provided they come within the scope of the appended claims and their equivalents.

What is claimed is:

1. A method for manufacturing a liquid crystal display, comprising:

mounting a source polarizer to which a support sheet is adhered and a first base sheet roll on respective rollers;

forming a first prism sheet roll by inputting resin to a first soft mold and forming a first prism portion comprising a plurality of peaks and a first stitch portion on the first base sheet roll;

fabricating an optical film comprising a space defined by a direct contact between a bottom surface of the support sheet and the plurality of peaks of the first prism portion through coalescence of the polarizer roll and the first prism sheet roll by a compression roller and cutting of the optical film; and attaching the optical film to a bottom surface of a liquid crystal display panel, and wherein the first stitch portion is in a direction perpendicular to a length direction of the peaks of the first prism portion.

2. The method of claim 1, wherein the first soft mold comprises rollers and a prism pattern sheet wound on the rollers, and wherein a prism pattern and a stitch adhesion unit are formed on the prism pattern sheet.

3. The method of claim 1, further comprising:
mounting a diffusion sheet roll on a roller; and
fabricating the optical film through coalescence of the diffusion sheet roll along with the polarizer roll and the first prism sheet roll by a compression roller and cutting of the optical film.

4. The method of claim 1, further comprising:
mounting a second base sheet roll on a roller;

forming a second prism sheet roll by inputting resin to a second soft mold and forming a second prism portion and a second stitch portion on the second base sheet roll; and fabricating the optical film through coalescence of the second prism sheet roll along with the source polarizer and the first prism sheet roll by a compression roller and cutting of the optical film.

5. The method of claim 1, wherein the first stitch portion is at least at both sides of the prism sheet.

6. The method of claim 1, wherein the first stitch portion fills a valley between adjacent peaks of the first prism portion.

7. The method of claim 1, wherein the first stitch portion has a width of at least 1 mm.

8. The method of claim 1, further comprising an additional prism sheet under the first prism sheet.

9. The method of claim 1, wherein the polarizer includes at least one core layer.

10. The method of claim 9, wherein the polarizer further comprises a protection layer on at least one surface of the core layer.

11. The method of claim 1, further comprising a backlight unit configured to provide light to the bottom surface of the liquid crystal display panel, the backlight unit including a light source, a light guide plate, and a reflection plate.

* * * * *